US008327979B2

(12) United States Patent
Lynch et al.

(10) Patent No.: US 8,327,979 B2
(45) Date of Patent: Dec. 11, 2012

(54) PORTABLE NON-MOTORIZED AUTOMATIC LIFT AND TRANSPORT APPARATUS FOR SMALL VEHICLES

(76) Inventors: Patrick Lynch, New Braunfels, TX (US); Jeff Rogers, New Braunfels, TX (US); Jeff Crouch, New Braunfels, TX (US); Joseph D. Whitney, Dallas, TX (US)

( * ) Notice: Subject to any disclaimer, the term of this patent is extended or adjusted under 35 U.S.C. 154(b) by 532 days.

(21) Appl. No.: 12/456,157

(22) Filed: Jun. 10, 2009

(65) Prior Publication Data

US 2010/0032244 A1 Feb. 11, 2010

(51) Int. Cl.

| | |
|---|---|
| ***B66B 9/16*** | (2006.01) |
| ***B66F 7/24*** | (2006.01) |
| ***B60P 3/06*** | (2006.01) |
| ***B60R 9/00*** | (2006.01) |
| *A61G 3/08* | (2006.01) |

(52) U.S. Cl. ........ 187/242; 187/241; 187/212; 414/462; 414/921; 254/425; 224/497; 224/499

(58) Field of Classification Search .................. 187/203, 187/212, 220, 267, 241, 242; 414/228, 462, 414/498, 921; 254/425; 224/488, 497, 499; *B60P 3/06; A61G 3/08; B60R 9/06, 9/00*
See application file for complete search history.

(56) References Cited

U.S. PATENT DOCUMENTS

| | | | | |
|---|---|---|---|---|
| 2,148,932 | A | 2/1939 | Fisher | |
| 2,579,688 | A | 12/1951 | McCormick | |
| 2,796,952 | A * | 6/1957 | Brumby | 187/212 |
| 4,582,500 | A * | 4/1986 | Hanson et al. | 446/423 |
| 5,011,361 | A | 4/1991 | Peterson | |
| 5,595,465 | A | 1/1997 | Knott | |
| 5,816,763 | A * | 10/1998 | Hamann et al. | 414/462 |
| 5,984,613 | A * | 11/1999 | Motilewa | 414/462 |
| 6,579,055 | B1 | 6/2003 | Williams | |
| 6,595,398 | B2 | 7/2003 | Himel, Jr. | |
| 2002/0168257 | A1 | 11/2002 | Smith et al. | |
| 2003/0165376 | A1 * | 9/2003 | Bruno et al. | 414/462 |
| 2006/0093462 | A1 | 5/2006 | Pradenas | |
| 2006/0180399 | A1 * | 8/2006 | Stanislao | 187/201 |

* cited by examiner

*Primary Examiner* — Emmanuel M Marcelo
*Assistant Examiner* — Stefan Kruer
(74) *Attorney, Agent, or Firm* — Schultz & Associates, P.C.

(57) ABSTRACT

A portable, non-motorized automatic lift and transport apparatus allows users to lift and transport a small, powered vehicle with minimal physical exertion and without the need for secondary power source. The apparatus is comprised of a base and platform connected to a gear housing. The gear housing telescopically engages and moves vertically within a vehicle mount via a gear system. The drive wheels of the small, powered vehicle to be transported power the gear system attached to the gear housing to rotate the gear system and subsequently lift the to-be-transported vehicle using its own power source. A storage position is provided that can be used without disengaging a transmission.

17 Claims, 10 Drawing Sheets

PORTABLE NON-MOTORIZED AUTOMATIC LIFT AND TRANSPORT APPARATUS FOR SMALL VEHICLES

CROSS-REFERENCE TO RELATED APPLICATIONS

This application claims priority benefit from U.S. patent application Ser. No. 11/891,189 entitled "Portable Non-Motorized Automatic Lift and Transport System for Small Vehicles" filed on Aug. 10, 2007.

FIELD OF THE INVENTION

The present invention relates to the lifting and transportation of personal motorized vehicles. In particular, the invention relates to a portable, non-motorized, automatic lift and transport apparatus that is mounted to a transport vehicle and is powered by the drive wheels of the lifted/transported personal vehicle.

BACKGROUND OF THE INVENTION

Those who are physically challenged or have limited mobility often require the use of a motorized wheelchair or scooter for transportation. Sometimes the maximum distance of travel for these individuals is to the range of the motorized vehicle itself. Frequently, desired destinations are further from the person's home than the charge or fuel range of the motorized vehicle thus preventing the individual from reaching these destinations. A market, a park, or any location where the individual requires the aid of a wheelchair or scooter to sustain mobility or to access items they desire combined with the need to transport the wheelchair or scooter to the destination is out of reach. Without the ability to transport the motorized vehicle, the individual is basically stranded and often emotionally challenged and harmed through their immobility and limited lifestyle. Studies have indicated that personal mobility is directly correlated to mental and physical well being. Many users of motorized wheelchairs or scooters are on a fixed income and cannot necessarily afford the expense of a motorized lift and transportation apparatus in addition to the scooter itself thereby eliminating their ability to use such a wheelchair in locations where they may be of great need.

Additionally, other motorized vehicles such as All-Terrain Vehicles (ATV), riding lawnmowers, and self powered tillers often require transportation to locations where they can be of use.

An example of the prior art, U.S. Pat. No. 5,011,361 to Peterson, discloses a vehicle mountable carrier for three-wheeled scooters. The carrier includes a central support mast attachable to a motor vehicle at a trailer hitch. The mast requires a separate ball screw actuator operated by a DC motor connected to the electric system of the transport vehicle. The carrier moves a platform between a lowered and raised position. The carrier is specifically designed for three wheeled scooters and requires a separate motor connected to the carrier to operate.

U.S. Pat. No. 6,595,398 to Himel, Jr. discloses a vehicle mounted wheelchair rack for transporting a folded wheelchair. The rack integrates a jack assembly having a jack shaft and handle into a stationary frame coupled to the rear of the transportation vehicle. A telescoping member moves in a vertical casing upon actuation of the jack assembly. An alternate embodiment replaces the jack shaft and handle with a threaded screw rod rotatably coupled in the vertical casing.

The lifting procedure of the Himel device is either by manual cranking of a jack handle or rotating the screw rod via a handle or powered drill.

U.S. Patent Application No. 2006/0093462 to Pradenas discloses an electrically powered threaded shaft mechanism attached to a standard scooter. A fixed support arm is mounted to the rear of a transportation vehicle via a trailer hitch. The scooter lifting mechanism uses a lifting motor and threaded shaft attached on the scooter itself to lift the scooter into position on the fixed support arm. The lifting mechanism uses the scooter's battery to supply electrical power to the lifting motor. The battery voltage must match the required voltage of the lifting motor and supply sufficient current to lift the vehicle. The scooter must be rotated into a vertical position on its rear wheels by lifting the front end of the scooter manually to attach the scooter to the fixed support arm connected to the transportation vehicle.

The prior art shows many versions of racks and trailers attached to vehicles for carrying other vehicles and wheelchairs. But problems arise when a user with limited mobility must load a motorized wheelchair or scooter onto such a rack or trailer without assistance. A rack that can easily lift and secure the scooter into a transportable position is desirable.

Therefore there is a need for an automatic lifting and transport system that does not require manual lifting, does not require a separate motor or an electrical power source, and is flexible enough to accommodate different, small-powered vehicles such as wheelchairs, scooters, riding lawnmowers, and ATVs.

One advantage of the disclosure of this apparatus is that the mechanical problems of present lift systems are alleviated. The apparatus does not require an independent power source or a power source matched to a drive motor. A further advantage is that the user of the apparatus does not have to perform any lifting. This is an important advantage, because the typical users of powered wheelchairs and scooters often are elderly or have limited mobility and are unable to perform strenuous physical activity. A further advantage over present lift systems is that manufacturing cost is substantially reduced because of the elimination of electrical motors and control systems required by the prior art. Still further, the disclosure is advantageous because it does not require a separate trailer and the complexity and maintenance necessitated by it.

SUMMARY OF INVENTION

One preferred embodiment provides a portable, non-motorized automatic lift and transport apparatus for powered scooters and the like. The preferred embodiment requires neither extensive physical exertion nor external power sources. The preferred embodiment lifts and holds a small, self-powered vehicle and attaches it to a vehicle to destinations where it can be of use. The preferred embodiment relies on the motor and drive wheels of the transported vehicle to provide power to lift it.

Accordingly, an embodiment of the apparatus provides a frame for direct stable attachment to a transportation vehicle such as a car, truck, or RV. The frame supports a housing. The housing supports a threaded shaft nut for engagement with a threaded shaft. The threaded shaft is supported in a coupling unit which telescopes inside the housing. The threaded shaft includes a pinion gear rigidly attached to its lower end. The coupling unit is attached to a platform supporting the transported vehicle. The platform includes openings for the drive wheels of the transported vehicle. The transported vehicle is secured to the platform by a receiving mechanism. As the transported vehicle is secured to the platform, the drive wheels of the transported vehicle are engaged with a rotor bar supported by the frame. The rotor bar is supplied with a high friction surface and may further include high friction pads of different sizes to reduce slippage between the rotor bar and the drive wheels. The rotor bar is free to rotate about its central linear axis. The rotor bar includes a bevel gear for engagement with the pinion gear.

To lift and transport the powered vehicle, it is driven onto the platform. A coupling included on the underside of the powered vehicle engages the receiving mechanism and locks the vehicle into place on the platform. The drive wheels of the powered vehicle are engaged with the rotor bar and turn the rotor bar when activated. As the rotor bar turns, the gear on the rotor bar engages the pinion gear on the threaded shaft and turns it. As the threaded shaft rotates, the threaded shaft nut fixed in the vertical housing forces the threaded shaft, the coupling unit and attached platform upwards. To lower the powered vehicle, the drive wheels are rotated in the opposite direction and the process is reversed.

The disclosure provides a storage position. Actuator arms are provided which engage an actuator bar provided on the frame. The actuator arms tilt the frame upwards into a storage position. Lowering the platform reverses the motion.

Those skilled in the art will appreciate the above-mentioned features and advantages of the invention together with other important aspects thereof upon reading the detailed description that follows in conjunction with the drawings provided.

BRIEF DESCRIPTION OF THE DRAWINGS

In the detailed description of the preferred embodiments presented below, reference is made to the accompanying drawings.

DETAILED DESCRIPTION OF THE PREFERRED EMBODIMENT

Figure 1:
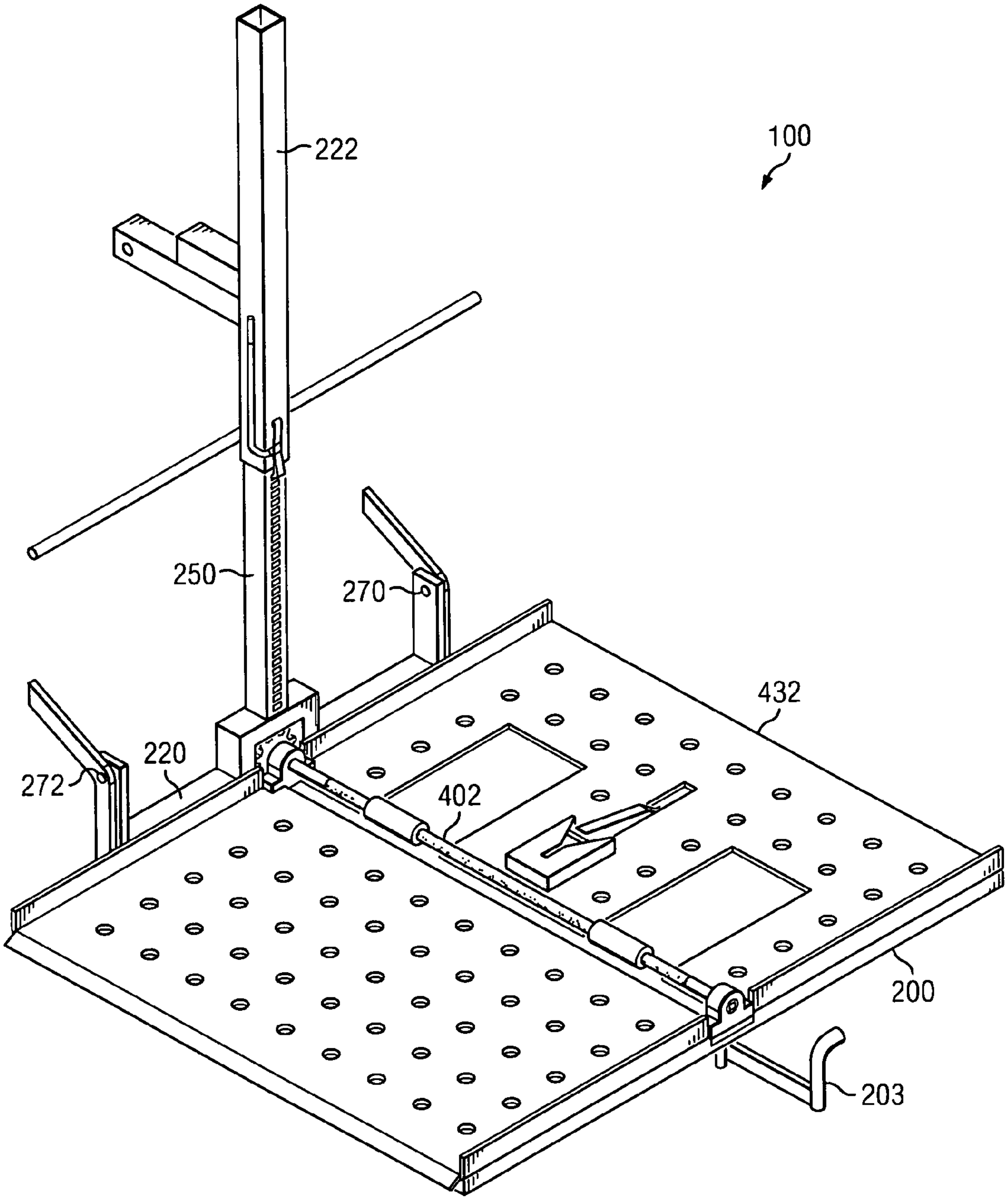
FIG. 1 is an isometric view of a preferred embodiment of the present disclosure.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

In one embodiment, lift and transport apparatus 100 is comprised of a vertical housing, a threaded shaft housing, a coupling unit, a base, a platform, a threaded shaft, and a rotor bar. Rotor bar 402 is mounted on platform 432. Platform 432 is connected to base 200 via weld or machine screws. Base 200 is pivotably connected to coupling unit 220. Coupling unit 220 is welded to or integrally formed with threaded shaft housing 250. Threaded shaft housing 250 encloses threaded shaft 404, extends vertically from coupling unit 220, and telescopically engages vertical housing 222. Vertical housing 222 is connected to a transportation vehicle via a trailer hitch insert or another common rigid connection known in the art.

Vertical housing 222 is formed of hollow steel square tubing approximately ⅛" to ¼"×1½" inch. Vertical housing 222 telescopically receives threaded shaft housing 250. Threaded shaft housing 250 and coupling unit 220 are formed of square steel tubing approximately ⅛" to ¼"×1" to 1¼".

Platform 432 is generally rectangular in shape and comprises two sections 440 and 442 separated by gap 444. Section 442 includes rectangular shaped cutouts 436 and 438. Additionally, section 442 includes insert hole 434. Platform 432 is formed of ⅛" to ½" aluminum plate. The plate may be drilled to reduce weight.

Figure 2:
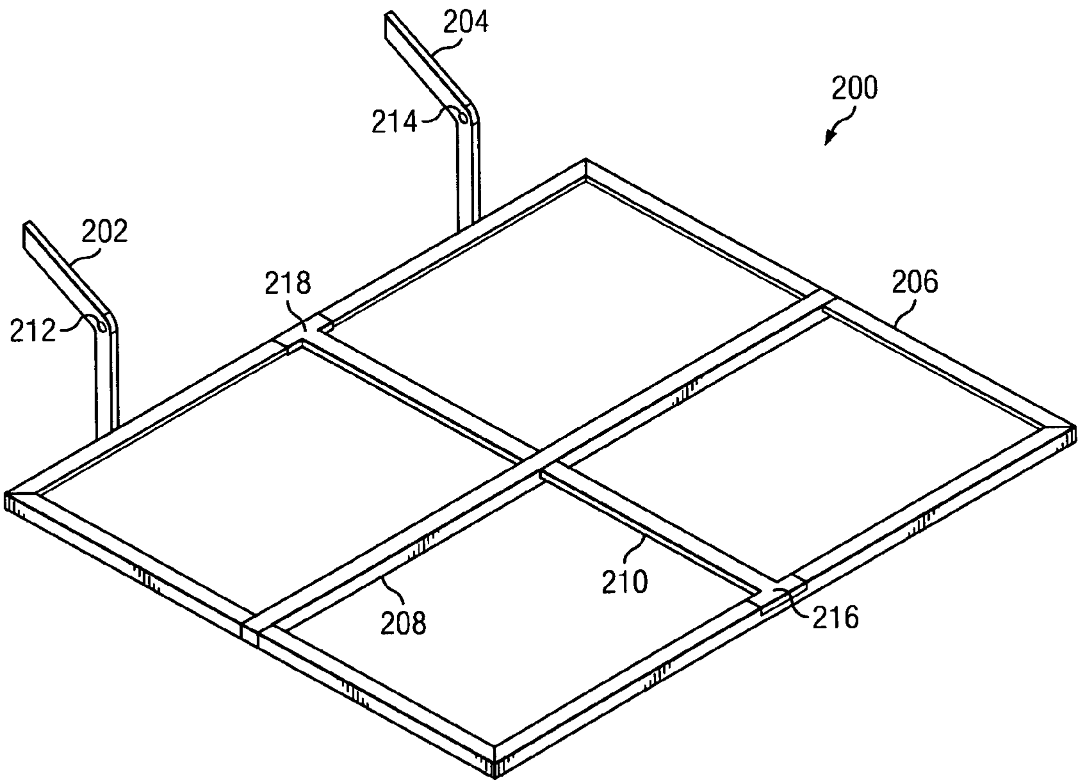
FIG. 2 is an isometric view of the base of a preferred embodiment of the present disclosure.

Referring to FIG. 2, base 200 is comprised of a rectangular shaped frame 206 having approximately the same dimensions as platform 432. Frame 206 further includes two crossmembers 208 and 210 intersecting perpendicularly for structural rigidity. Crossmember 210 includes mount points 216 and 218 at each end.

Figure 5:
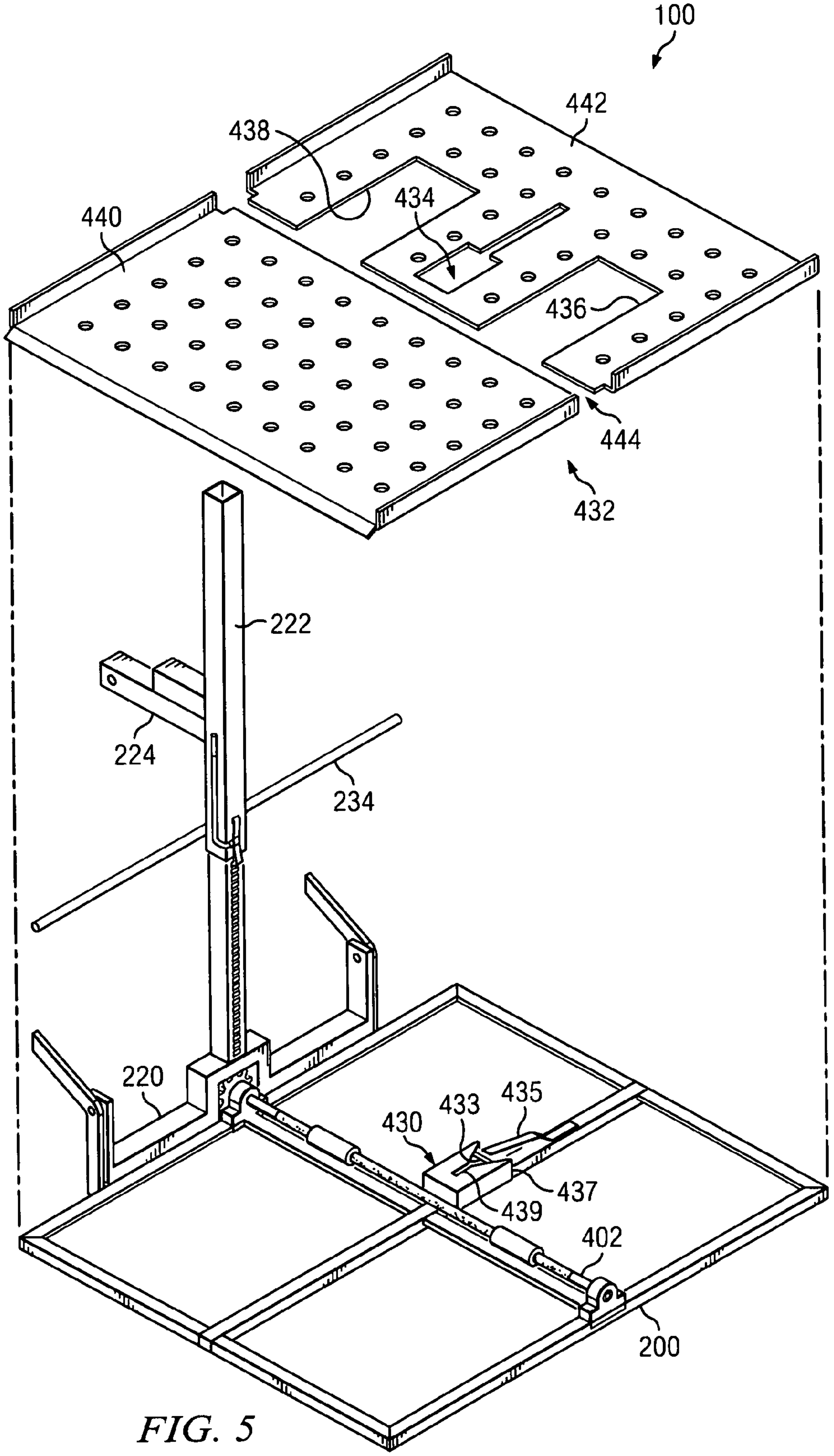
FIG. 5 is an exploded isometric view of a preferred embodiment of the present disclosure.

Insert 430 (shown in FIG. 5) is removably mounted near the midpoint of crossmember 208 with machine screws or permanently with a weld. Insert 430 includes latchbox 437 with guide slot 439. The open face of latchbox 437 includes locking bar 433, transversely mounted. Adjacent locking bar 433 is spring catch 435. Spring catch 435 is a resilient spring steel.

Returning to FIG. 2, frame 206 is preferably stainless steel angle of ¼" to ½" width. Crossmembers 208 and 210 are ¼" to ½" square steel tubing. Equidistant from mount point 218 and welded to one edge of frame 206 are tilt actuating arms 202 and 204. Tilt actuating arms 202 and 204 are ⅛" to ½" steel. Tilt actuating arms 202 and 204 include holes 212 and 214 respectively. Holes 212 and 214 are ¼" to ½" in diameter.

Figure 3:
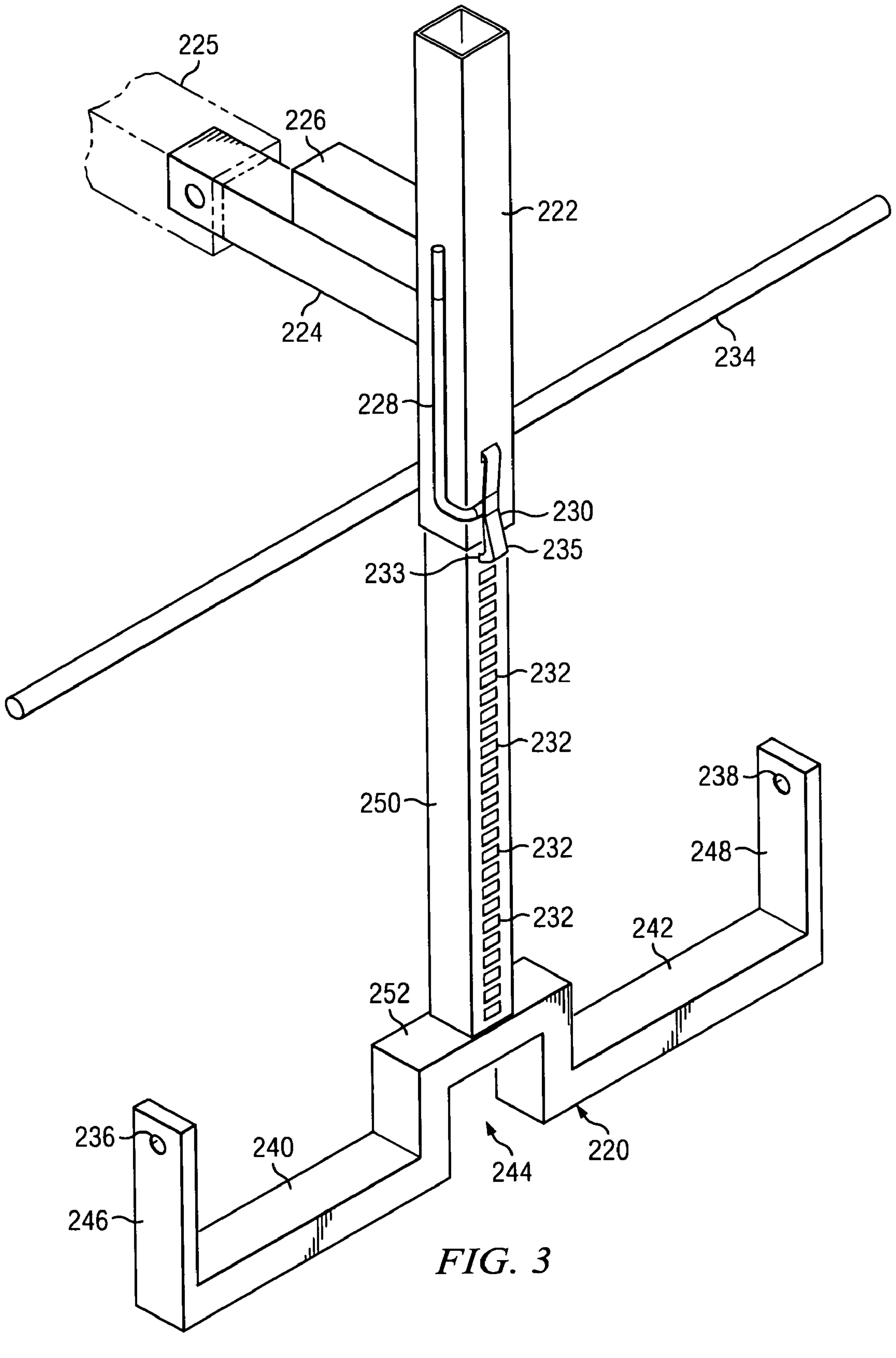
FIG. 3 is an isometric view of the coupling unit and the vertical housing of a preferred embodiment of the present disclosure.

As shown in FIG. 3, coupling unit 220 is comprised of arms 240 and 242 separated by gap 244 and connected to each other by bridge 252. Opposite bridge 252, arm 240 includes flange 246 extending from arm 240 at approximately 90 degrees. Opposite bridge 252, arm 242 includes flange 248 extending approximately 90 degrees from arm 242. Flanges 246 and 248 are ⅛" to ½" steel integrally formed with or welded to coupling unit 220. Flanges 246 and 248 further include pivot holes 236 and 238 respectively. Pivot holes 236 and 238 are ¼" to ½" in diameter. Threaded shaft housing 250 extends approximately perpendicularly from coupling unit 220 from approximately the center of bridge 252. Threaded shaft housing 250 further includes a plurality of equally spaced, rectangularly shaped holes 232. Pins or screws concentrically align holes 212 and 214 with pivot holes 236 and 238 respectively and rotatably attach coupling unit 220 to base 200 with pins 270 and 272 (as shown in FIG. 1).

Hitch insert 224 extends from vertical housing 222 approximately perpendicularly. Hitch insert 224 is integrally formed with or is welded to vertical housing 222. Hitch insert 224 interfaces with hitch receiver 225 which is permanently affixed to a transportation vehicle. Hitch received 225 shown in shadow is well known in the art. Support 226 is adjacent hitch insert 224 and vertical housing 222. Support 226 is welded to hitch insert 224 and vertical housing 222 for added strength. Vertical housing 222 also includes actuating bar 234. The midpoint of actuating bar 234 is welded to the vertical housing underneath hitch insert 224 at approximately a right angle with the vertical housing. Actuating bar 234 extends from two sides of vertical housing 222. Actuating bar 234 is a ½" diameter steel bar and is approximately 24" in length.

Vertical housing 222 further includes handle 228 and latch 230. Latch 230 is comprised of spring steel spot welded to the outside of vertical housing 222. Latch 230 includes an angled latch head 235. Angled latch head 235 includes ratchet surface 233. Ratchet surface 233 and holes 232 form a ratchet and pawl mechanism designed to allow vertical travel of vertical housing 222 in an upward direction only. Handle 228 is attached to latch 230 at approximately a midpoint. Handle 228 and latch 230 combine with holes 232 to provide a safety-locking feature.

Figure 4:
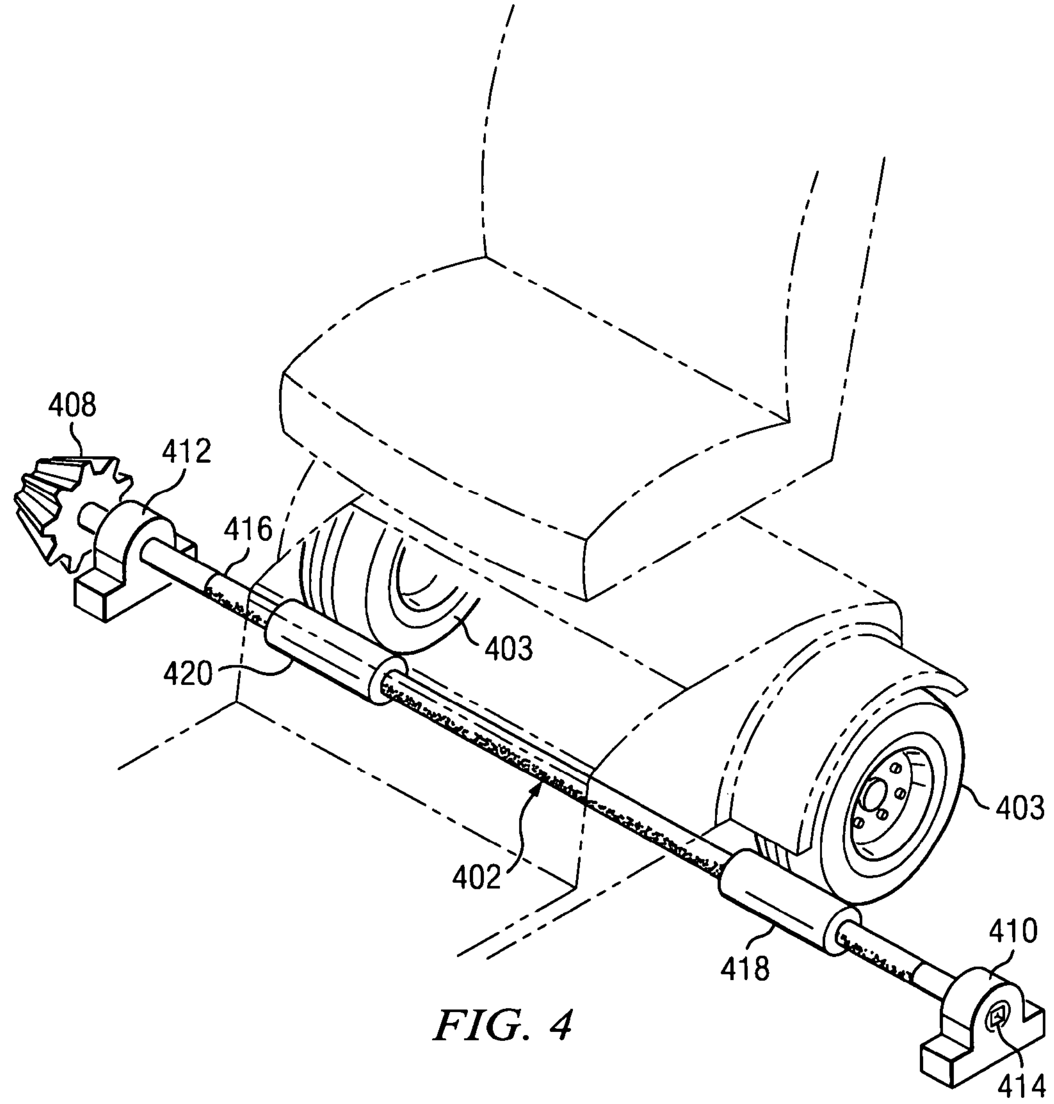
FIG. 4 is an isometric view of the rotor bar of a preferred embodiment of the present disclosure.

Rotor bar 402 is shown in FIG. 4. Rotor bar 402 is a 1" diameter steel bar having a length exceeding the length of crossmember 210. Rotor bar 402 is supported in mounts 410 and 412 with roller bearings. Mounts 410 and 412 are attached to base 200 at mount points 216 and 218 respectively with ¼" to ½" steel bolts. Mount 410 includes square socket insert 414. Rotor bar 402 includes high friction surface 416. In a preferred embodiment, wheel pads 418 and 420 are affixed to rotor bar 402. Wheel pads 418 and 420 are aligned with cutouts 436 and 438, respectively. The wheel pads of the preferred embodiment comprise flexible neoprene cylinders affixed to the rotor bar with a suitable adhesive. Different outside diameters of wheel pads are provided. FIG. 4 also shows drive wheels 403 of the scooter 411 (shown in shadow) adjacent wheel pads 420.

Figure 7:
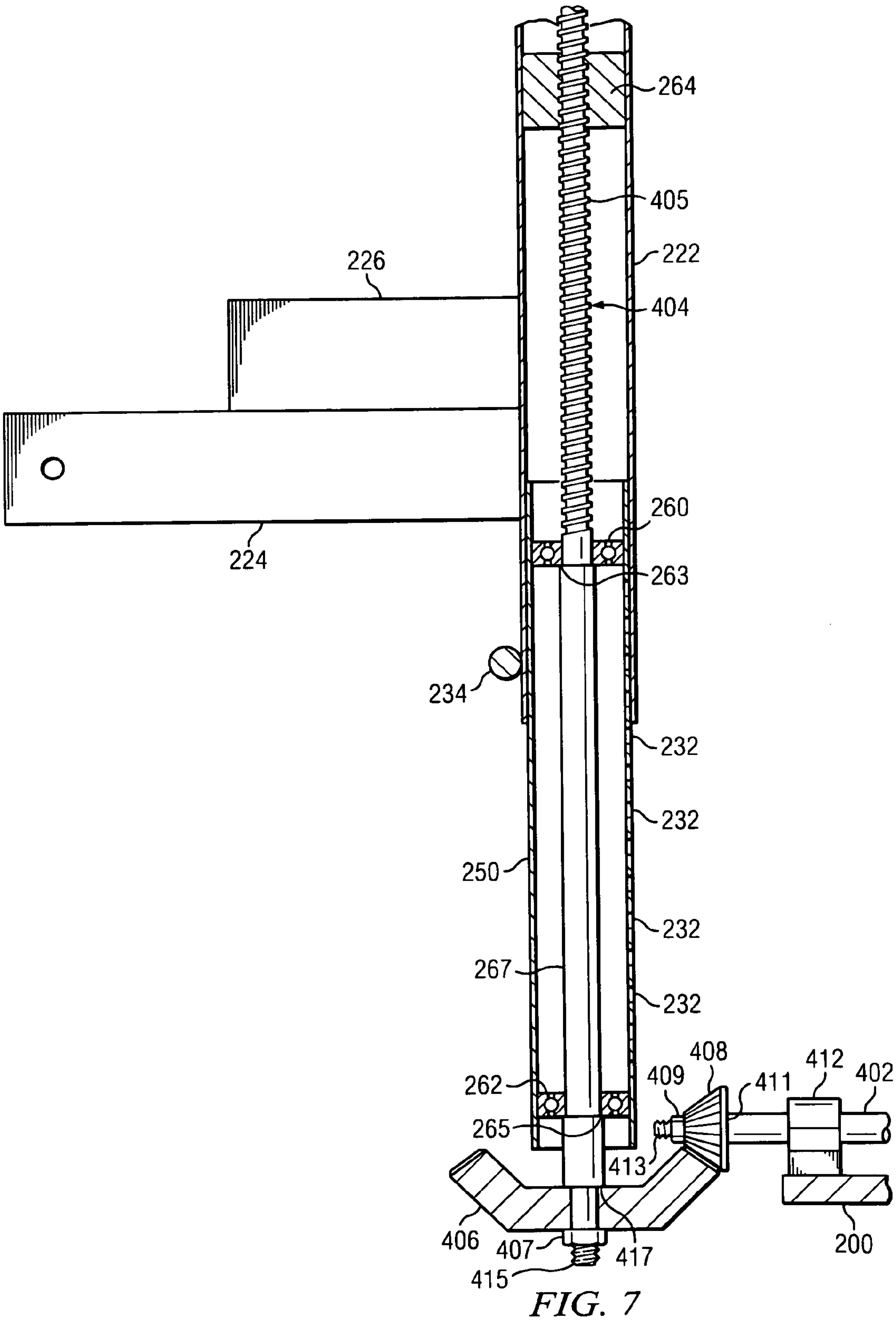
FIG. 7 is a plan view of the coupling unit, threaded shaft, and vertical housing of a preferred embodiment of the present disclosure.

FIG. 7 shows a cutaway view of vertical housing 222, threaded shaft housing 250 and transmission components. Threaded shaft 404 is a ½" to 1" diameter steel rod approximately 36" in length. Threaded shaft 404 includes threaded section 405. Threaded section 405 includes threads with a pitch of about 3degrees. Threads of pitch between 2° and 10° have been found to function correctly. Other pitch angles will function. Lower pitch threads are employed in higher weight applications as will be understood by those in the art. Threaded shaft 404 includes unthreaded section 267, shoulder 263 and shoulder 265. Shoulder 263 is a larger diameter than the diameter of threaded section 405 and supports inner race of bearing 260. Shoulder 265 is a slightly larger diameter than unthreaded section 267 and supports the inner race of bearing 262.

Threaded shaft 404 includes shoulder 417. Pinion gear 406, abuts shoulder 417 and is held in place by nut 407 engaging threads 415. Relative rotation between pinion gear 406 and threaded shaft 404 is prevented by a key way or flat, as known in the art. Threaded shaft 404 includes pinion gear 406 attached at its end. Pinion gear includes approximately 80 teeth at 10 pitch. Pinion gear 406 has a diameter of approximately 2". The longitudinal axes of vertical housing 222, threaded shaft housing 250, and threaded shaft 404 are concentric. Threaded shaft 404 is free to rotate in threaded shaft housing 250. Bearings 260 and 262 are fixed inside threaded shaft housing 250. Bearings 260 and 262 allow threaded shaft 404 to rotate and move vertically and additionally fix the position of threaded shaft 404 horizontally relative to threaded shaft housing 250. Threaded shaft 404 rotates in threaded shaft nut 264. Threaded shaft nut 264 is fixed inside vertical housing 222. Threaded shaft nut 264 mates with threaded shaft 404. Thus as threaded shaft 404 rotates, it advances through threaded shaft nut 264.

Rotor bar 402 further includes bevel gear 408 located on the end of the rotor bar proximate mount 412. Bevel gear 408 engages pinion gear 406. Bevel gear 408 includes approximately 20 teeth at 10 pitch. Of course other numbers of teeth and pitches will function. The ratio between the pinion gear and the bevel gear provides for an increase in torque at the base of the threaded rod and to provide additional lifting force.

Rotor bar 402 supports bevel gear 408 through shoulder 411. Rotor shaft 402 includes threaded section 413. Nut 409 mates with threads 413 and holds bevel gear 408 adjacent shoulder 411. Relative rotation between bevel gear 408 and rotor shaft 402 is prevented through the use of a key way (not shown) or flat, as known in the art.

Figure 9:
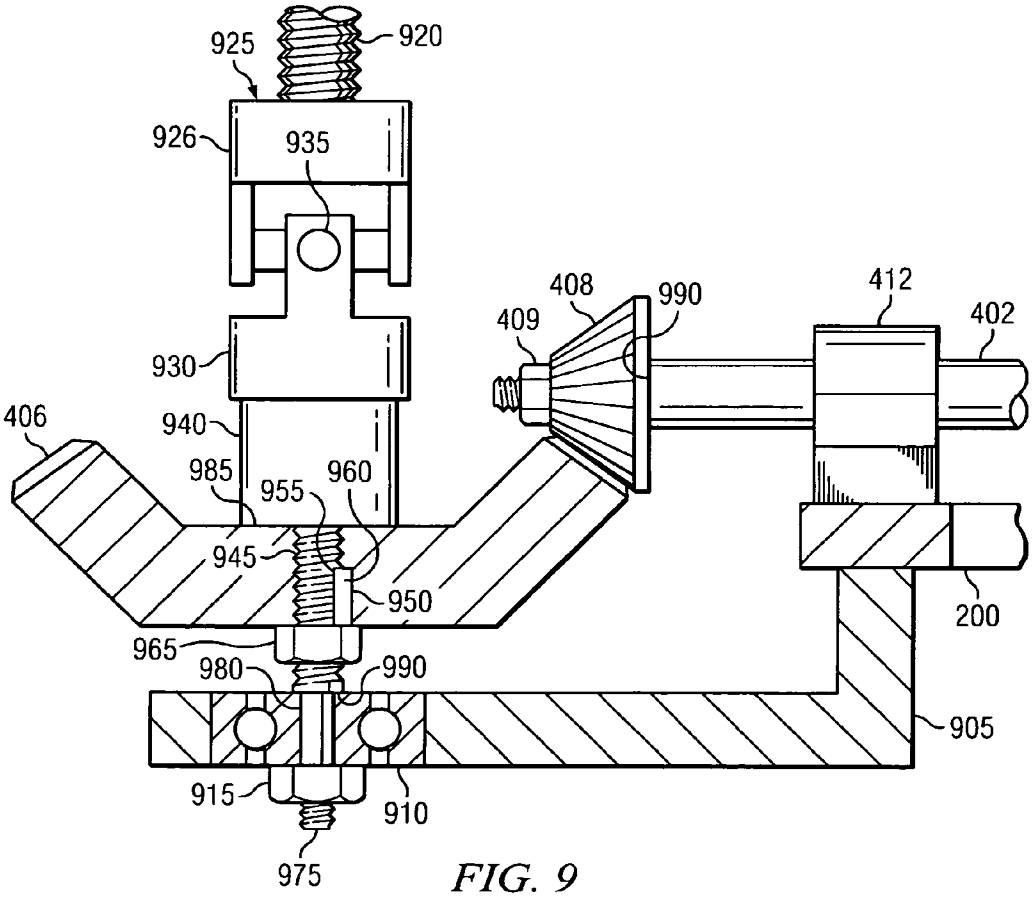
FIG. 9 is a cutaway side view of an alternate embodiment of a transmission of the present disclosure.
Figure 10:
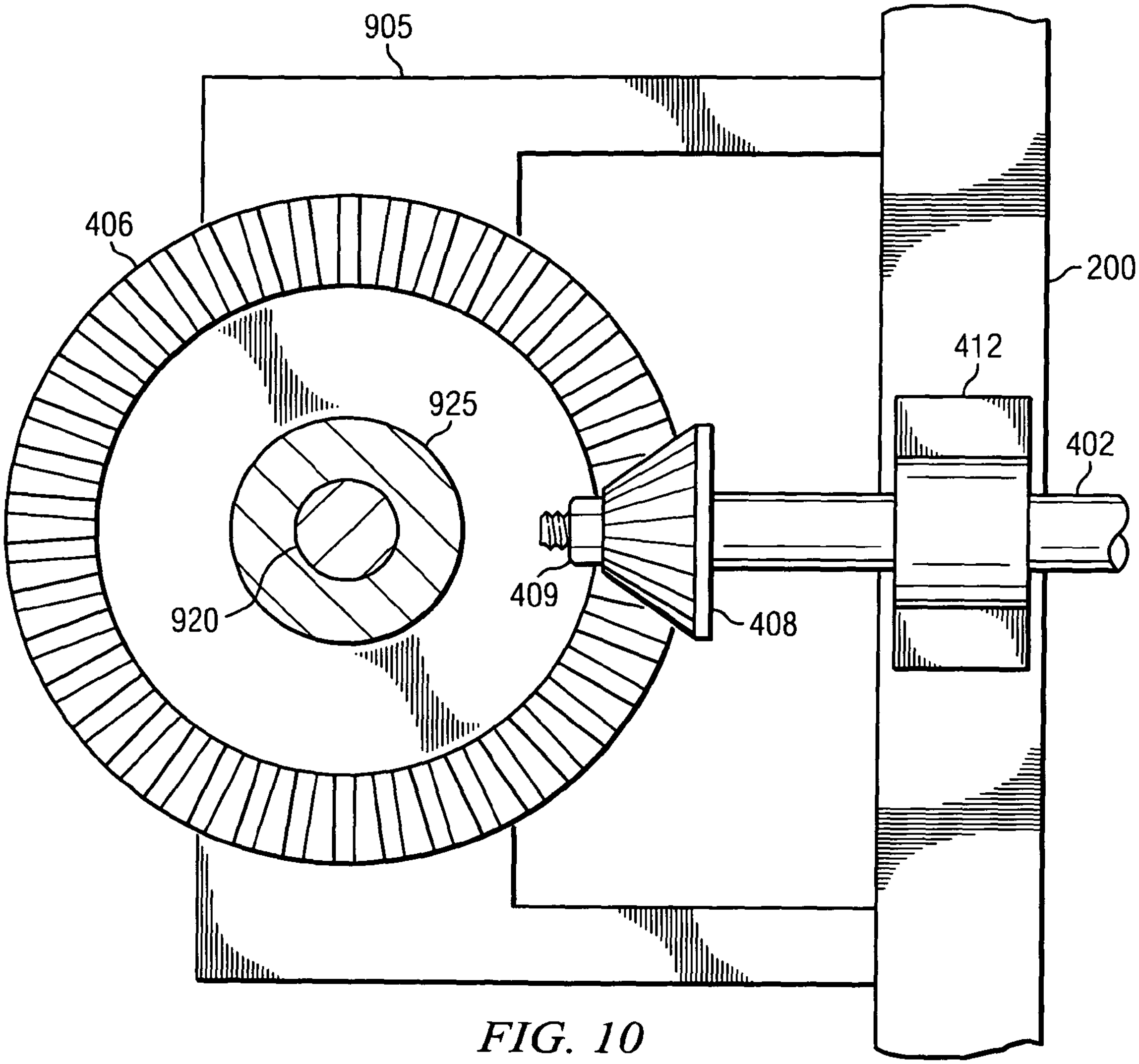
FIG. 10 is a partial plan view of an alternate embodiment of a transmission of the present disclosure.
Figure 12:
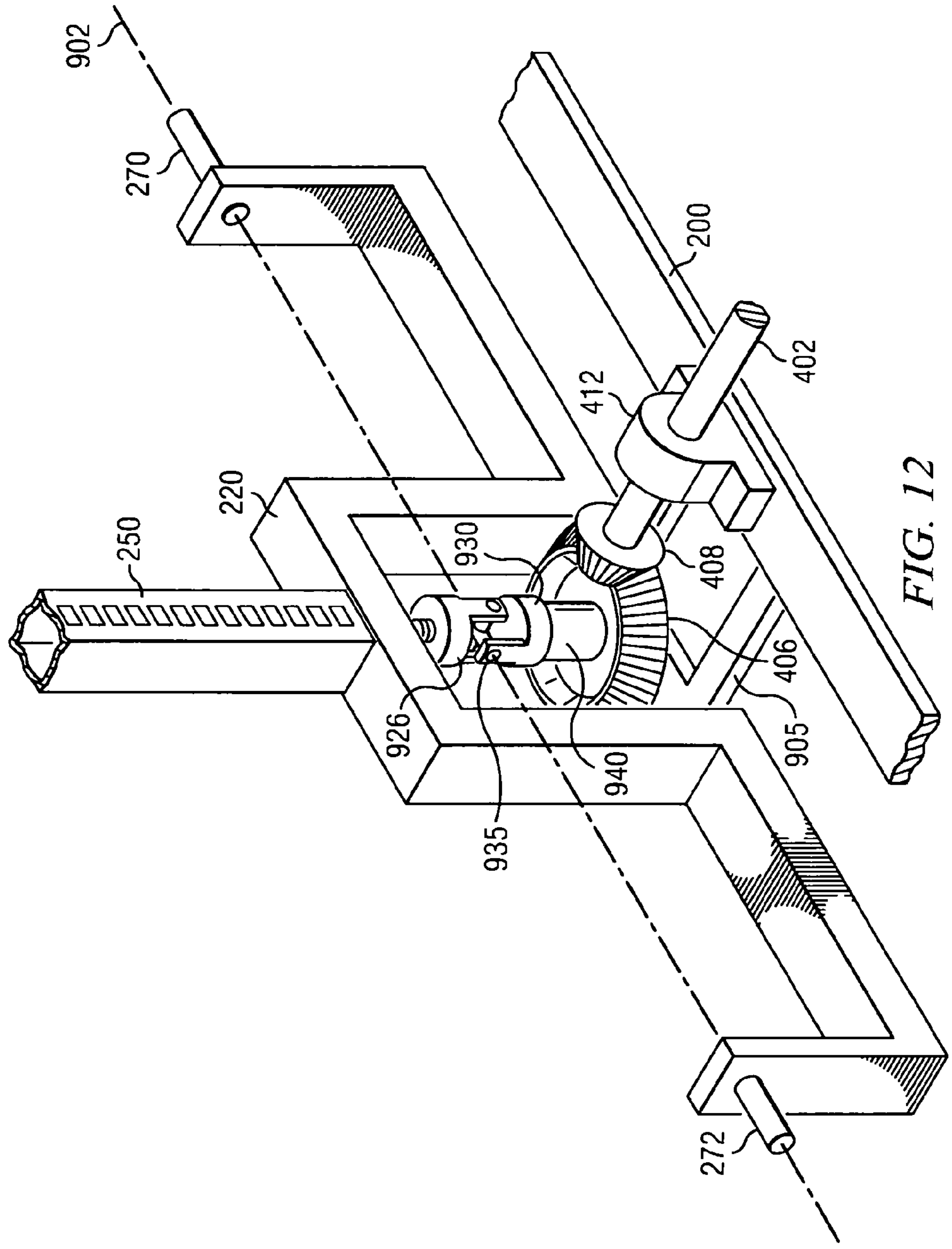
FIG. 12 is an isometric view of an alternate embodiment of a transmission of the present disclosure.

Referring to FIGS. 9, 10, and 12, an alternate embodiment of the transmission system of the disclosure is provided. Threaded rod 920 is attached to universal joint 925 at upper half 926. Upper half 926 is connected to lower half 930 with crossmember 935. Lower half 930 of universal joint 925 is connected to extension shaft 940. Extension shaft 940 includes shoulder 985, threaded section 945, reduced diameter section 980, and threaded section 975. Pinion gear 406 is held adjacent shoulder 985 by nut 965 threaded onto threaded section 945. Relative rotation between pinion gear 406 and extension shaft 940 is prevented by key way 960, pinion slot 955 and slot 950. Those skilled in the art will appreciate that universal joint 925 may be replaced by a constant velocity joint or flexible coupling as known in the art.

Bearing 910 is provided adjacent shoulder 990 and held in place by nut 915 on threaded section 975. Threaded section 975 has a diameter less than threaded section 945. Diameter of threaded section 945 is less than the diameter of extension shaft 940. Bearing 910 is seated within support frame 905. Support frame 905 is welded to the bottom of base 200.

Importantly, the plane 902 formed by crossmember 935 when it is perpendicular to the axis of threaded rod 920 and extension shaft 940, must pass through the line formed by the axis of pin 272 and pin 270, thereby allowing pinion gear 406, bevel gear 408 and support frame 905 and their associated components to rotate upwards around the axis of pin 272 and pin 270 while both rotor bar 402 and threaded rod 920 are turning.

Figure 11:
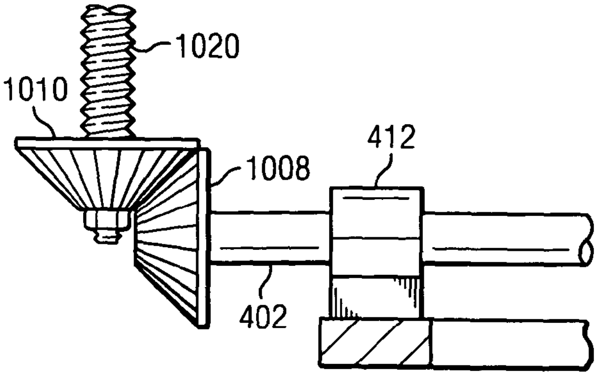
FIG. 11 is a cutaway side view of an alternate embodiment of a transmission of the present disclosure.

Referring now to FIG. 11, an alternate embodiment of the transmission system of the disclosure is provided. Miter gear 1010 is affixed to one end of threaded rod 1020. Miter gear 1010 has an upper diameter that is greater than its lower diameter. Miter gear 1008 is affixed to one end of rotor bar 402 which is rotationally supported in mount 412. Mount 412 is mounted to base 200. Miter gear 1008 engages miter gear 1010 from below. An example of miter gears 1008 and 1010 are 10 pitch, 20 teeth miter gears from Boston Gear of Charlotte, N.C.

Figure 8:
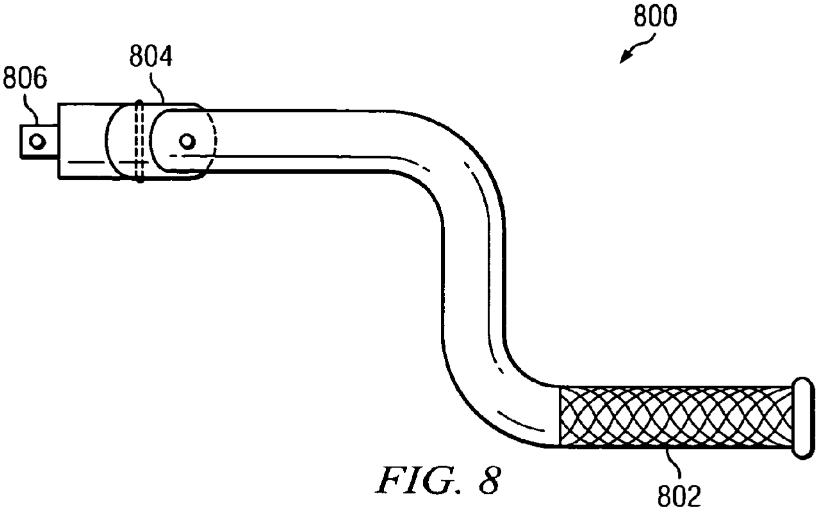
FIG. 8 is a plan view of a hand crank of a preferred embodiment of the present disclosure.

FIG. 8 depicts hand crank 800. Hand crank 800 is comprised of handle 802, gimbal 804, and ratchet head 806. Hand crank 800 is a 1" diameter steel rod approximately 18" in length and bent or rolled to have two opposite 90 degree bends. Handle 802 is proximate one end of hand crank 800 and gimbal 804 is pinned to the opposite end. Gimbal 804 is free to rotate about the axis of its pin approximately 180 degrees. Ratchet head 806 is pinned to gimbal 804. Ratchet head 806 is free to rotate approximately 180 degrees about the axis of its pin. Ratchet head 806 is sized to engage socket insert 414.

In use, lift and transport apparatus 100 may be mounted to a transportation vehicle via a standard trailer hitch. Other methods of rigid connection are possible. In a preferred embodiment, hitch insert 224 engages the trailer hitch on the transportation vehicle and is secured by a hitch lock and pin as is common in the art. Lift and transport apparatus 100 translates between three positions. The first position is the "loading" position, the second position is the "loaded" position, and third position is the "stored" position.

FIG. 1 shows lift and transport apparatus 100 in the "loading" position. Base 200 is adjacent the surface of the ground. The powered vehicle to be transported, such as a scooter, drives on to platform 432 via section 442. A transportation hook mounted on the scooter (not shown) engages insert 430 and locks the scooter into place. As the scooter becomes locked into insert 430, the drive wheels of the scooter move through cutouts 436 and 438 and become adjacent to and are tightly pressed against wheel pads 418 and 420. Apparatus 100 is designed to incorporate multiple sizes and shapes of powered vehicles, it may be necessary to change or remove wheel pads 418 and 420 to accommodate different sized drive wheels.

The motor and drive wheels of the scooter provide the power to raise the lift and transport apparatus with the scooter secured on the platform into the "loaded" position. Once the scooter is fully engaged with insert 430, secured into place, and the drive wheels are adjacent rotor bar 402, the drive wheels of the scooter (not shown) are activated. The drive wheels of the scooter rotate rotor bar 402. As rotor bar 402 rotates, bevel gear 408 rotates. The rotation of bevel gear 408 consequently rotates pinion gear 406 and threaded shaft 404. Bearings 260 and 262 allow threaded shaft 404 to rotate within threaded shaft housing 250. Consequently, helical drive nut 264 allows threaded shaft 404 to advance through vertical housing 222. As a result of the force of bearings of 260 and 262 on shaft housing 250, coupling unit 220, base 200, and platform 432 all move vertically. Threaded shaft housing 250 slides telescopically inside vertical housing 222, thereby raising the attached scooter. When proper ground clearance is reached, the drive wheels of the scooter are deactivated. Latch 230 is engaged in the plurality of holes 232 thereby preventing unintended movement.

To unload the scooter, handle 228 is used to unlock latch 230 and the scooter's drive wheels are rotated in the opposite direction. Once base 200 is resting on the ground surface, the scooter is disengaged from insert 430 and driven off platform 432.

Figure 6:
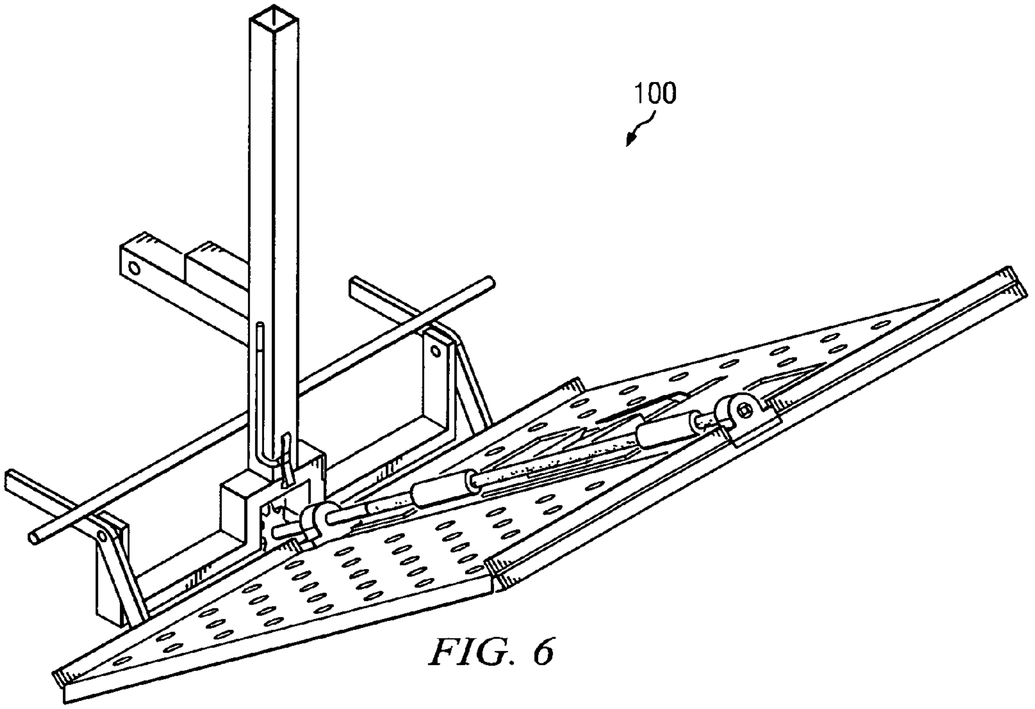
FIG. 6 is an isometric view of a preferred embodiment of the present disclosure in a stowed position.

The third position or the "stored" position is shown in FIG. 6 When lift and transport apparatus 100 is not in use it is desirable to store the apparatus in a convenient and space saving manner. As the drive wheels of a transported vehicle are unavailable, hand crank 800 is used to rotate rotor bar 402 by hand. Ratchet head 806 is inserted into socket insert 414. Gimbal 804 allows hand crank 800 to rotate while hand crank 800 is engaged with socket insert 414 at varying angles. Hand crank 800 rotates rotor bar 402 which in turn rotates bevel gear 408. Bevel gear 408 as a result of its engagement with pinion gear 406 rotates pinion gear 406 and threaded shaft 404. Threaded shaft 404 engages helical drive nut 264 and threaded shaft 404, threaded shaft housing 250, coupling unit 220, base 200, and platform 432 rise vertically. Threaded shaft 404, threaded shaft housing 250, coupling unit 220, base 200, and platform 432 rise vertically until tilt actuating arms 202 and 204 come in contact with actuating bar 234. As the actuating bars contact actuating bar 234, base 200 and platform 432 begin to pivot upward around pivot pins 270 and 272. The higher the base and platform are raised via rotating the hand crank, the more they will pivot until they reach a maximum angle of approximately 45°. At this point, bevel gear 408 disengages from pinion gear 406. The base and platform are then moved to a completely vertical orientation manually. When base 200 is in a vertical position, lock 203 is rotated into position behind vertical housing 222.

In the case of the second preferred embodiment, as rotor bar 402 rotates, bevel gear 408 rotates pinion gear 406. Pinion gear 406 in turn rotates transition shaft 940 and universal joint 925 thereby rotating threaded rod 920. As base 200 is lifted, tilt actuating arms 202 and 204 engage actuating bar 234 thereby rotating base 200 upward about pivot pins 270 and 272. As a result, support frame 905 rotates upward, thereby moving the entire transmission upward and changing the angle between the axis of transition bar 940 and threaded rod 920. The process continues until a "stored position" of between 45° and 60° is reached.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:

1. An apparatus for lifting a powered vehicle having a set of drive wheels, wherein the apparatus is attached to a receiver of a transportation vehicle, the apparatus comprising:
- a vertical housing having a hitch insert for connection to the receiver;
- a helical drive nut rigidly supported within the vertical housing;
- a threaded shaft engaging the helical drive nut;
- the threaded shaft having a first support shoulder and a second support shoulder;
- a lift frame telescopically extending within the vertical housing;
- a first bearing, rigidly attached to the lift frame and adjacent the first support shoulder;
- a second bearing, rigidly attached to the lift frame and adjacent the second support shoulder;
- a universal joint attached to the threaded shaft;
- the universal joint further attached to a first angled gear;
- a support frame having a support surface for supporting the powered vehicle;
- a rotor bar, pivotally attached to the support frame and frictionally engaging the set of drive wheels;
- a second angled gear rigidly attached to the rotor bar and meshed with the first angled gear;
- an actuator arm rigidly connected to the support frame and pivotally connected to the lift frame about a pivot axis;
- the universal joint further comprises an upper section connected to a lower section by a crossmember, where the crossmember defines a plane which passes generally through the pivot axis; and
- whereby when the drive wheels are engaged, the support platform is lifted.

2. The apparatus of claim 1, wherein the lift frame includes a plurality of pawl slots and the vertical housing includes a ratchet mechanism, adjacent the plurality of pawl slots for preventing downward movement of the lift frame.

3. The apparatus of claim 2, wherein the ratchet mechanism includes a release handle for disengagement from the plurality of pawl slots.

4. The apparatus of claim 1, wherein the support frame includes a receiver for engagement with the powered vehicle for holding the powered vehicle on the support frame.

5. The apparatus of claim 4, wherein the receiver includes a locking bar and a spring latch.

6. The apparatus of claim 1, wherein the first angled gear is a pinion gear and the second angled gear is a bevel gear.

7. The apparatus of claim 6, wherein the rotor bar includes a removable crank.

8. The apparatus of claim 1, further comprising:

an actuating bar attached to the vertical housing and adjacent the actuator arm; and whereby when the support frame is raised, the actuating bar engages the actuating arm and tilts the support frame with respect to the vertical housing about the pivot axis.

9. The apparatus of claim 1, wherein the rotor bar includes a set of variable sized roller pads adjacent the drive wheels.

10. The apparatus of claim 1, wherein the rotor bar includes a removable crank.

11. The apparatus of claim 1, wherein the first angled gear is a larger diameter than the second angled gear.

12. The apparatus of claim 1, wherein the first angled gear is a first miter gear and the second angled gear is a second miter gear.

13. A method of lifting a powered vehicle having a set of drive wheels, and supporting the powered vehicle by a carrier vehicle having a receiver, the method comprising:

providing a vertical housing constraining a helical drive nut;

rigidly attaching the vertical housing to the receiver;

providing a threaded shaft having a first support shoulder and a second support shoulder;

engaging the helical drive nut with the threaded shaft;

providing a lift frame telescopically extending within the vertical housing;

providing a first bearing, rigidly attached to the lift frame and adjacent the first support shoulder;

providing a second bearing, rigidly attached to the lift frame and adjacent the second support shoulder;

providing a first angled gear rigidly attached to the threaded shaft;

providing a support frame pivotably attached to the lift frame at a pivot axis and having a support surface;

providing a rotor bar, rotatably attached to the support frame;

providing a second angled gear rigidly attached to the rotor bar and engaged with the first angled gear;

providing a flexible rotary joint mounted on the threaded shaft and adjacent the second angled gear and defining a bending plane which passes generally through the pivot axis;

loading the powered vehicle onto the support frame with the set of drive wheels in frictional contact with the rotor bar; and, engaging the drive wheels to lift the support frame to a loaded position.

14. The method of claim 13, further comprising the steps of:

providing an actuator arm rigidly connected to the support frame;

providing the actuator arm pivoted to the support frame about the pivot axis;

providing an actuating bar attached to the vertical housing and adjacent the actuator arm; and, rotating the rotor bar whereby the actuating bar engages the actuator arm and tilts the support frame without disengaging the first angled gear from the second angled gear.

15. A lift and transport apparatus for raising and moving a small, powered scooter having a set of drive wheels, the apparatus engaged with a transportation vehicle and comprising:

a vehicle mount removably engaged with the transportation vehicle, the vehicle mount comprising a hitch insert integrally formed with a vertical hollow body, wherein the vertical hollow body further includes a gear nut mounted internally therein and an actuating bar rigidly mounted perpendicularly to the vertical hollow body;

the vertical hollow body further including a safety handle mounted externally where the safety handle is further connected to a safety latch;

a gear housing telescopically engaged with the vertical hollow body and including a plurality of safety holes for engagement with the safety latch;

the gear housing integrally formed with and perpendicularly extending from a coupling unit;

the coupling unit comprising a first arm and a second arm separated by a space and connected by a bridge and wherein the first arm includes a first flange extending perpendicularly and wherein the second arm includes a second flange extending perpendicularly;

a base having a first pivot bar pivotably connected to the first flange about a pivot axis and a second pivot bar pivotably connected to the second flange about the pivot axis wherein the base is further comprised of the first pivot bar and the second pivot bar integrally formed with, and extending from, a rectangular shaped frame; a pair of intersecting crossmembers within the frame; and an insert mounted at the intersection of the pair of crossmembers;

a platform rigidly fixed to the base wherein the platform further comprises a first half separated from a second half by a gap and wherein the first half further includes a first rectangular cutout and second rectangular cutout;

a gear system comprised of a rotor bar, a universal joint, and a threaded rod where the rotor bar is supported by a first set of bushings mounted to the base;

wherein the universal joint further comprises an upper section connected to a lower section by a crossmember, where the crossmember defines a plane which passes generally through the pivot axis;

an extension shaft connected to the lower half of the universal joint, where the extension shaft includes a first threaded section and a second threaded section;

the rotor bar extends through the gap and further includes a ratchet insert and a first gear engaged with a second gear mounted on the first threaded section;

a support frame extending from the base and pivotally supporting the second threaded section;

wherein the rotor bar is frictionally engaged with the drive wheels;

wherein the threaded rod extends through the coupling unit and is concentrically aligned with the gear housing;

wherein the threaded rod is supported within the gear housing by a second set of bushings, wherein the threaded rod extends through the gear housing and further engages the gear nut;

whereby when the drive wheels are engaged, the platform is raised to a loaded position; and, whereby when the platform is raised, the actuating bar engages the first and second flanges and the base is tilted with respect to the vertical hollow body and the gear housing about the pivot axis and through the plane of the crossmember without disengaging the first gear from the second gear.

16. The lift and transport apparatus of claim 15 where the rotor bar is fitted with a traction inducing material.

17. The lift and transport apparatus of claim 15 where the rotor bar further includes a first wheel pad aligned with the first cutout and a second wheel pad aligned with the second cutout.

* * * * *